United States Patent [19]
Umeda

[11] Patent Number: 5,115,178
[45] Date of Patent: May 19, 1992

[54] GRAVITY COMPENSATING MECHANISM FOR ARTICULATED TYPE INDUSTRIAL ROBOTS

[75] Inventor: Tsuyoshi Umeda, Tokyo, Japan
[73] Assignee: Seiko Instruments Inc., Japan
[21] Appl. No.: 580,643
[22] Filed: Sep. 10, 1990
[30] Foreign Application Priority Data
  Sep. 27, 1989 [JP] Japan .................................. 1-253082
[51] Int. Cl.⁵ .............................................. B25J 9/20
[52] U.S. Cl. ............................ 318/568.11; 318/568.1; 901/18; 901/28; 901/129; 395/1
[58] Field of Search ............................... 318/560–636; 364/513; 901/9, 12, 13, 14, 15–23, 27, 28, 29, 49, 50; 414/680, 735

[56] References Cited
U.S. PATENT DOCUMENTS

| | | | |
|---|---|---|---|
| 4,348,142 | 9/1982 | Figour | 901/15 X |
| 4,348,575 | 9/1982 | Hedren et al. | 901/28 X |
| 4,579,558 | 4/1986 | Ramer | 901/18 X |
| 4,661,039 | 4/1987 | Brenholt | 364/513 X |
| 4,693,665 | 9/1987 | Friederichs et al. | 901/20 X |
| 4,884,670 | 12/1989 | McCormick et al. | 901/29 X |

*Primary Examiner*—Paul Ip
*Attorney, Agent, or Firm*—Bruce L. Adams; Van C. Wilks

[57] ABSTRACT

Herein disclosed is a gravity compensating mechanism for an articulated type industrial robot having upper and lower arms whirling in the direction of gravity. The upper and lower arm gravity compensating mechanism includes a cam mechanism and an elastic member in the robot to solve problems: that the whirling range of the robot arms is narrowed by the spring means of the gravity compensating mechanism; that the gravity compensating mechanism is disposed outside of the robot arms to restrict the working space; and that it is difficult to disposed the gravity compensating mechanism for the upper arm.

3 Claims, 3 Drawing Sheets

GRAVITY COMPENSATING MECHANISM FOR ARTICULATED TYPE INDUSTRIAL ROBOTS

BACKGROUND OF THE INVENTION

The present invention relates to a gravity compensating mechanism for an articulated type industrial robot.

The apparatus of the prior art will be described in the following with reference to FIG. 3. In the known direct drive type articulated industrial robot, second and third motors are mounted on a swivel 32 which is driven to whirl in a horizontal plane by a first motor mounted on a stationary base 31. This industrial robot includes: a first lower arm (i.e., first arm) 34 supported to whirl on a first horizontal axis 35 and driven to whirl in the direction of gravity by the second motor; a second lower arm (i.e., second arm) 38 supported to whirl on a second horizontal axis 36 at the upper end of the first arm 34 and driven to whirl in the direction of gravity by the third motor; and an upper working arm (i.e., third arm) 37 connected to the second arm 38 through a link 37a to whirl in the direction of gravity.

In the direct drive type articulated industrial robot of this type, the moment on the first horizontal axis 35 caused by the gravities of the third arm 37 and the first arm 34 are applied to the second motor for driving the first arm 34, and the moment on the second horizontal axis caused by the gravity of the third arm 37 is applied to the third motor for driving the third arm 37. Since these moments will change with the angles of gradient of the first arm 34 and the third arm 37, the magnitude of the loads to be applied to the second motor and the third motor change with the angles of gradient of the first and third arms.

The moment due to the gravity will take its maximum, when the arm is in a horizontal position, and will decrease along the COS curve, as the arm whirls, until it takes a zero value when the leading end of the arm is directed vertically upward or downward. In order to generate a moment in the opposite direction to balance the above-specified moment, the robot is equipped in the prior art with a gravity compensating mechanism.

In the gravity compensating mechanism of the prior art, as shown in FIG. 3, the gravity is compensated by a spring mechanism 33 which has its one and other ends attached to the swivel 32 and an upper portion of the first arm 34.

In the case of this gravity compensating mechanism of the prior art, the moment resulting from the force of the spring mechanism 33 in the direction opposite to the moment on the first horizontal axis 34 due to the gravity is given on the first horizontal axis 35. Despite this fact, however, there arise problems: the whirling range of the first arm 34 is restricted by the spring mechanism 33; the gravity compensating mechanism of the spring mechanism 33 is disposed outside of the first arm 34 to restrict the working space; the moment of the third arm 37 on the second horizontal axis 36 due to the gravity cannot be compensated so that the third motor is large-sized to compensate the moment on the second horizontal axis.

SUMMARY OF THE INVENTION

In order to solve these problems, the present invention contemplates to provide a gravity compensating mechanism for an industrial robot having upper and lower arms whirling in the direction of gravity, which mechanism is composed of a cam mechanism and an elastic member for each of the upper and lower arms and disposed in the robot.

According to the present invention, there is provided a gravity compensating mechanism which comprises: a first rotary disc 18 mounted rotatably on said swivel 6 above said first horizontal axis 7 and coacting with said lower arm 8; a first cam follower 13 attached to said first rotary disc 18 eccentrically above said first horizontal axis 7; a first slider 9 held on said swivel 6 by a linear guide 23 and having its upper face contacting with said first cam follower 13; a first spring 4 arranged in said swivel 6 and having its upper end connected to the lower end of said first slider 9; a second rotary disc 19 mounted rotatably on said swivel 6 above said first horizontal axis 7 and coacting with said upper arm 21; a second cam follower 17 attached to said second rotary disc 19 eccentrically above said first horizontal axis 7; a second slider 10 held on said swivel 6 by a linear guide 23a and having its upper face contacting with said second cam follower 17; a second spring 5 arranged in said swivel 6 coaxially with said first spring 4 and having its upper end connected to the lower end of said second slider 10.

In the articulated industrial robot according to the present invention, the gravity compensating mechanism is built in the swivel to give a moment due to the force of the first spring in the opposite direction to the moment on the first horizontal axis due to the gravity of the lower arm, so that the moment on the second horizontal axis due to the gravity of the upper arm is changed to the moment on the first horizontal axis through the link. Thus, the moment in the opposite direction due to the force of the second spring is given to compensate the moment due to the gravity of the upper arm without restricting the whirling range of the lower arm by the spring mechanism. Since the gravity compensating mechanism is built in, it will not exert the restriction, which might otherwise be raised if it were disposed outside of the lower arm, upon the working space.

DESCRIPTION OF THE PREFERRED EMBODIMENT

Figure 1:
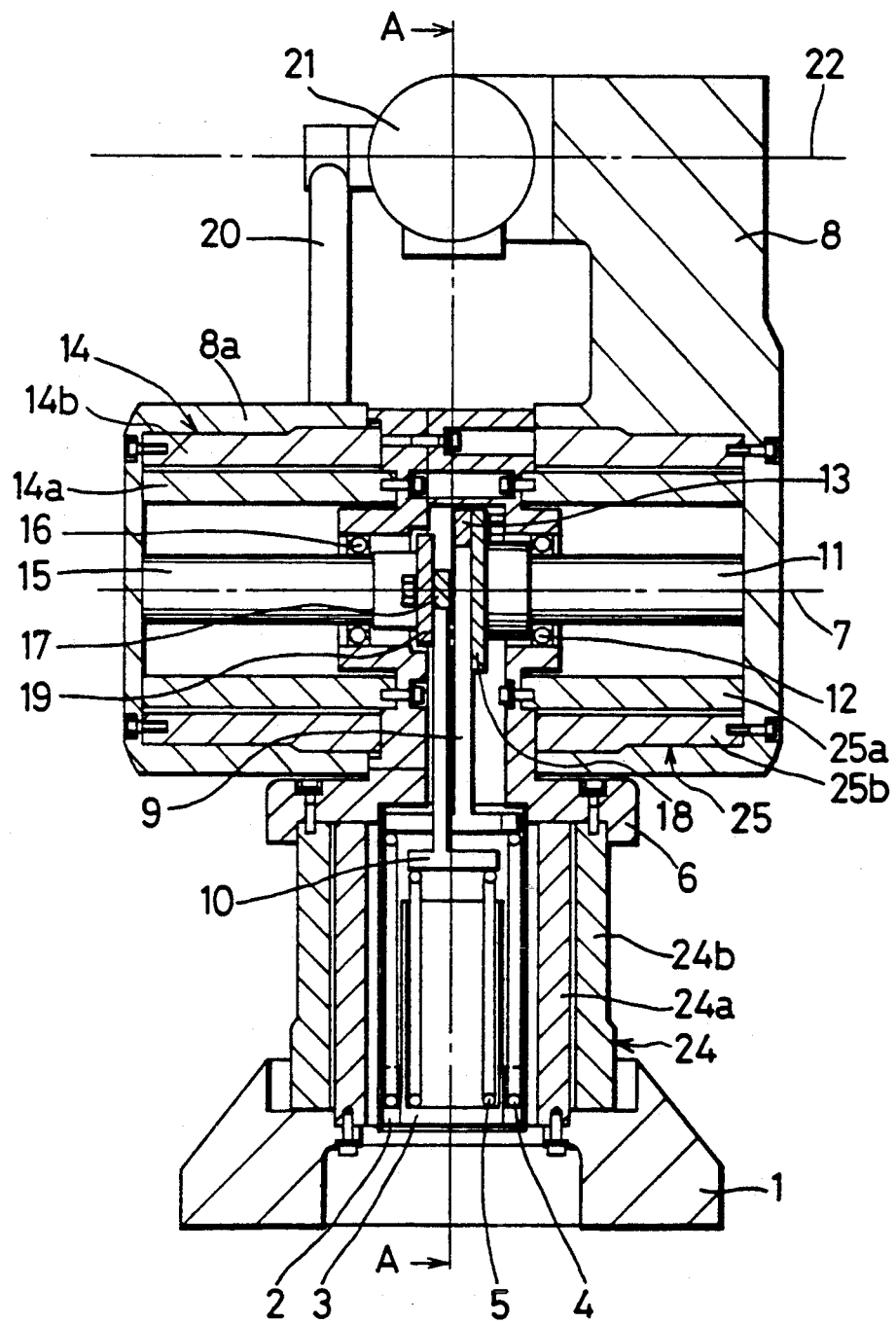
FIG. 1 is a front elevation showing one embodiment of the present invention.
Figure 2:
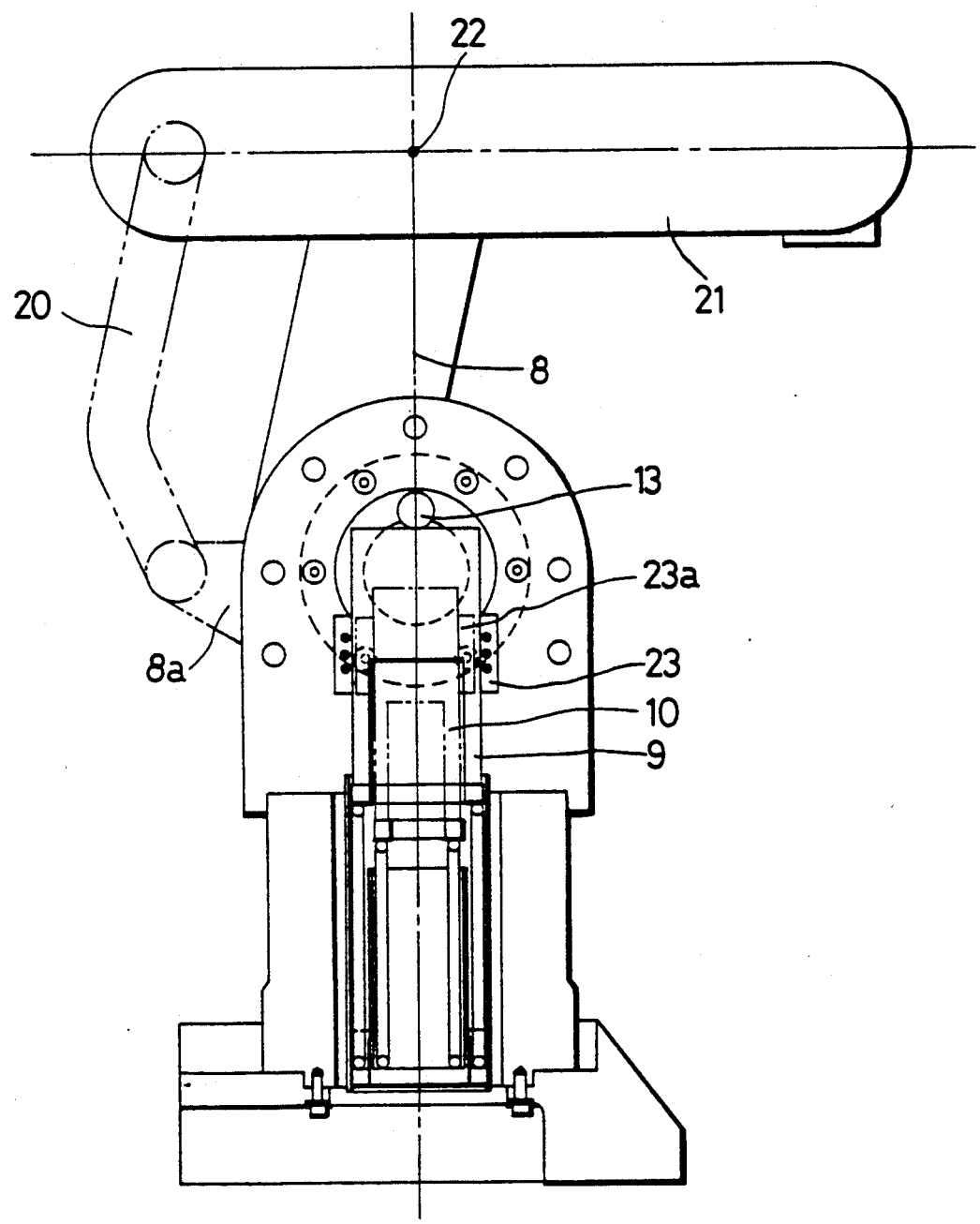
FIG. 2 is a section taken along line A—A of FIG. 1.
Figure 3:
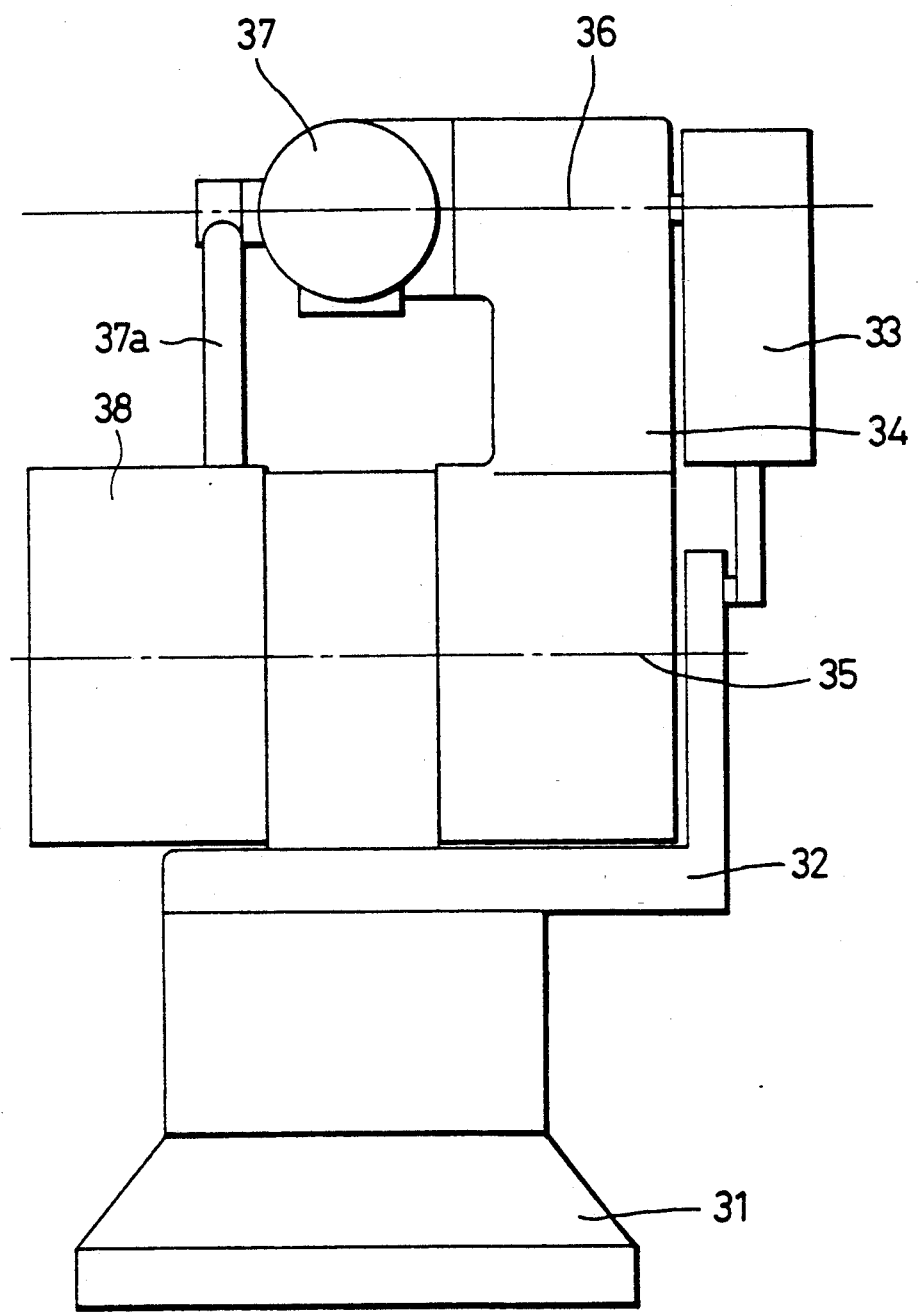
FIG. 3 is a front elevation showing the apparatus of the prior art.

An embodiment of the present invention will be described in the following with reference to the accompanying drawings. Of these, FIGS. 1 and 2 show one embodiment of the present invention. On a stationary base 1 of a direct drive type articulated industrial robot, as shown in FIGS. 1 and 2, there is mounted a first motor 24 which has its stator side 24a fixed to the base 1 and its rotor side (or output side) 24b connected to a swivel 6 disposed above the base 1 to swivel in a horizontal plane. As a result, the swivel 6 is horizontally swiveled by the rotations of the motor 24. Bearings 12 and 16 are disposed above the swivel 6 to bear a first shaft 11 and a second shaft 15 rotatably on a first horizontal axis 7. A first lower arm (i.e., first arm) 8 and a second lower arm (i.e., second arm) 8a are fixed at one-end sides of the first shaft 11 and the second shaft 15, respectively, and are supported to swivel in the direction of gravity. In the first lower arm 8, there is built a second motor 25, to the stator side 25a of which is fixed the swivel 6 and to the rotor side (i.e., output side) 25b of which is connected the first lower arm 8 so that it is swiveled around the first shaft 11 (i.e., in the direction of gravity) by the rotations of the second motor 25. Above the first lower arm 8, moreover, there is disposed an upper arm (i.e., third arm) 21 which is enabled to whirl on a second horizontal axis 22 in the direction of gravity.

In the second lower arm (i.e., second arm) 8a, on the other hand, there is built a third motor 14, to the stator side 14a of which is fixed the swivel 6 and the rotor side (or output side) 14b of which is connected the second lower arm 8a. As a result, this second lower arm 8a is also whirled in the direction of gravity by the rotations of the third motor 14.

A link 20 is connected in a whirling manner to the vicinities of the ends portions of the second lower arm 8a and the upper arm (i.e., third arm) 21. As a result, the upper arm (i.e., third arm) 21 is whirled on the first horizontal axis 7 (i.e., in the direction of gravity) by the swirls of the first lower arm and is rocked on the second horizontal axis 22 in the direction of gravity by the whirls of the second lower arm 8a.

Next, the gravity compensations will be described in the following. A first rotary disc 18 and a second rotary disc 19 are fixed on the end portions of the first shaft 11 and the second shaft 15, respectively, at the side of the swivel 6. To the first rotary disc 18, there is rotatably attached a first cam follower 13 which is positioned eccentric from the first horizontal axis 7. In the swivel 6, moreover, there is linearly movably disposed a first slider 9 which is guided by a linear guide (as shown in FIG. 2) 23 disposed in the swivel 6. To the lower end of the first slider 9, there is connected under compression a first compression spring 4 which is attached to the swivel 6 through a first nut 2. Moreover, the aforementioned first slider 9 is so arranged that it is pushed downward by the aforementioned first cam follower 13.

To the second rotary disc 19, on the other hand, there is rotatably attached a second cam follower 17 which is positioned eccentric from the first horizontal axis 7 (i.e., to this side of the sheet of FIG. 1). To the swivel 6, moreover, there is linearly movably attached through a linear guide 23a (as shown in FIG. 2) a second slider 10, to the lower end of which is connected under compression a second compression spring 5. This second compression spring 5 in turn is attached to the swivel 6 coaxially with the first compression spring 4 through a second nut 3. Moreover, the second slider 10 is so arranged that it is pushed downward by the aforementioned second cam follower 17.

In the direct drive type articulated industrial robot thus constructed according to the present invention, the force of the first spring gives a moment in the opposite direction through the first slider 9, the first cam follower 13, the first rootary disc 18 and the first shaft 11 to the moment on the first horizontal axis 7 due to the gravities of the first lower arm (i.e., first arm) 8 and the upper arm 21. Moreover, the force of the second spring 5 gives a moment in the opposite direction through the second slider 10, the second cam follower 17, the second rotary disc 19 and the second shaft 15 to both the moment on the second horizontal axis 22 due to the gravity of the upper arm (i.e., third arm) 21 and the moment on the first horizontal axis 7 due to the gravities of the second arm 8a and the link 20. As a result, the moments due to the gravities of the individual arms are subjected to the gravity compensations to solve the problem of the large size of the motors.

Although the present invention has been described in connection with its one embodiment, it should not be limited to the mode of the foregoing embodiment but can be further modified in various manners without departing from the scope of the invention, as defined in "WHAT IS CLAIMED IS."

As is now apparent from the description thus far made, the gravity compensation mechanism of the direct drive type articulated industrial robot according to the present invention is effective for the moments to be generated on the axes of whirl of the lower and upper arms. As a result, the motors for driving the upper and lower arms can be small-sized to set the whirling range of the lower arm free from the restrictions of the spring mechanisms. Since, moreover, the gravity compensation mechanism is built in the robot, it does not restrict the working space which might otherwise be restricted if the mechanism were disposed outside of the robot. Thus, it is possible to provide a direct drive type articulated industrial robot which can have its working space expanded.

What is claimed is:

1. In an articulated type industrial robot including: a lower arm for whirling on a first horizontal axis in the direction of gravity; and
   an upper arm disposed above said lower arm for whirling on a second horizontal axis in the direction of gravity,
   an articulated type industrial robot gravity compensating mechanism comprising two lines of mechanism disposed within the robot for compensating the gravities of said lower arm and said upper arm comprising a first elastic member, a first cam follower rotatably connected to the lower arm, a first slider biased by the first elastic member into contact with the first cam follower to provide a moment on the first horizontal axis having a direction opposite to the force of gravity of the lower arm, a second elastic member, a second cam follower rotatably connected to the upper arm and a second slider biased by the second elastic member into contact with the second cam follower to provide a moment on the second horizontal axis having a direction opposite to the force of gravity of the upper arm.

2. In an articulated type industrial robot including: a second motor and a third motor mounted on a swivel which is driven by a first motor mounted on a stationary base;
   a lower arm supported to swirl on a first horizontal axis and driven by said second motor; and
   an upper arm supported to whirl on a second horizontal axis at the upper end of said lower arm and driven by said third motor,
   a gravity compensating mechanism comprising:
   a first rotary disc mounted rotatably on said swivel above said first horizontal axis and coacting with said lower arm;
   a first cam follower attached to said first rotary disc eccentrically above said first horizontal axis;
   a first slider held on said swivel by a linear guide and wherein the first slider has its upper face contacting with said first cam follower;

a first spring arranged in said swivel and having its upper end connected to the lower end of said first slider;

a second rotary disc mounted rotatably on said swivel above said first horizontal axis and coacting with said upper arm;

a second cam follower attached to said second rotary disc eccentrically above said first horizontal axis;

a second slider held on said swivel by a linear guide and having its upper face contacting with said second cam follower;

a second spring arranged in said swivel coaxially with said first spring and having its upper end connected to the lower end of said second slider.

3. An articulated type industrial robot comprising:
a first arm pivotable about a first horizontal axis;
a second arm disposed above the first arm and pivotable about a second horizontal axis; and
means disposed entirely within the robot for compensating for the force of gravity on the first and second arms comprising for each arm elastic means exerting a force on the arm having a moment on the horizontal axis opposite to the force of gravity extended by the arm, the elastic means comprising a first elastic member, a first cam follower rotatably connected to the first arm, a first slider biased by the first elastic member into contact with the first cam follower to provide a moment on the first horizontal axis having a direction opposite to the force of gravity of the first arm, a second elastic member, a second cam follower rotatably connected to the second arm, and a second slider biased by the second elastic member into contact with the second cam follower to provide a moment on the second horizontal axis having a direction opposite to the force of gravity of the second arm.

* * * * *